US012645087B2

(12) United States Patent
Chen et al.

(10) Patent No.: US 12,645,087 B2
(45) Date of Patent: Jun. 2, 2026

(54) LENS ASSEMBLY AND AR GLASSES

(71) Applicants: Asphetek Solution (Chengdu) Ltd., Chengdu (CN); ADVANCED OPTOELECTRONIC TECHNOLOGY, INC., Hsinchu County (TW); Asphetek Solution Inc., Hsinchu (TW)

(72) Inventors: Shiue-Lung Chen, Hsinchu (TW); Chang-Ho Chen, Hsinchu (TW); I-Ming Cheng, Hsinchu (TW); Chung-Wu Liu, Hsinchu (TW); Chien-Cheng Kuo, Hukou (TW)

(73) Assignees: Asphetek Solution (Chengdu) Ltd., Chengdu (CN); ADVANCED OPTOELECTRONIC TECHNOLOGY, INC., Hsinchu County (TW); Asphetek Solution Inc., Hsinchu County (TW)

( * ) Notice: Subject to any disclaimer, the term of this patent is extended or adjusted under 35 U.S.C. 154(b) by 36 days.

(21) Appl. No.: 18/754,209

(22) Filed: Jun. 26, 2024

(65) Prior Publication Data

US 2025/0138329 A1      May 1, 2025

(30) Foreign Application Priority Data

Oct. 31, 2023    (CN) .......................... 202322936887.2

(51) Int. Cl.
*G02B 27/01* (2006.01)

(52) U.S. Cl.
CPC .. *G02B 27/0179* (2013.01); *G02B 2027/0187* (2013.01)

(58) Field of Classification Search
CPC ................... G02B 27/0179; G02B 2027/0187
See application file for complete search history.

(56) References Cited

U.S. PATENT DOCUMENTS

2019/0129178 A1* 5/2019 Patterson ............. G02B 6/0076
2022/0344524 A1* 10/2022 Wang .................... H10F 77/211
2024/0072424 A1* 2/2024 Huang .............. H01Q 15/0013
2024/0258682 A1* 8/2024 Shiu ......................... H01Q 1/44
2024/0356203 A1* 10/2024 Apaydin ................ H01Q 1/273
2025/0096456 A1* 3/2025 Morimoto .......... G02B 27/0172
2025/0124738 A1* 4/2025 Farsi ...................... G02C 11/10

* cited by examiner

*Primary Examiner* — Dmitriy Bolotin
(74) *Attorney, Agent, or Firm* — ScienBiziP, P.C.

(57) ABSTRACT

A lens assembly and AR glasses, including a lens, a sensing assembly, and one or more conducting assemblies. The sensing assembly is arranged on a first side of the lens. The conducting assemblies are arranged on the first side of the lens. Each conducting assembly comprises a transparent conductive layer, and a metal mesh layer. Wherein, the transparent conductive layer is placed on the first side of the lens. The metal mesh layer is placed on a side of the transparent conductive layer away from the lens. The metal mesh layer comprises a plurality of metal wires arranged at intervals. The plurality of the metal wires are electrically connected to the sensing assembly. The AR glasses includes a frame, and the lens assembly. The lens assembly is mounted on the frame.

11 Claims, 3 Drawing Sheets

LENS ASSEMBLY AND AR GLASSES

FIELD

The present disclosure relates to field of augmented reality technology, and in particular to a lens assembly and Augmented Reality (AR) glasses.

BACKGROUND

The lens used in the AR glasses are equipped with eye-tracking wires and light-sensitive sensing elements to track a position of eyes. The existing eye-tracking wires are mostly processed on glass and other substrates by evaporation, sputtering or electroplating. The wire width of the metal wires processed in this way is wide, and the transparency of the metal wires is not good, which reduces performance of the lens.

Thus, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of the embodiments described herein.

Several definitions that apply throughout this disclosure will now be presented.

The term "coupled" is defined as coupled, whether directly or indirectly through intervening components, and is not necessarily limited to physical connections. The connection may be such that the objects are permanently coupled or releasably coupled. The term "substantially" is defined to be essentially conforming to the particular dimension, shape, or other feature that the term modifies, such that the component need not have that exact feature. The term "comprising," when utilized, means "including, but not necessarily limited to"; it specifically indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein includes any and all combinations of one or more of associated listed items.

Figure 1:
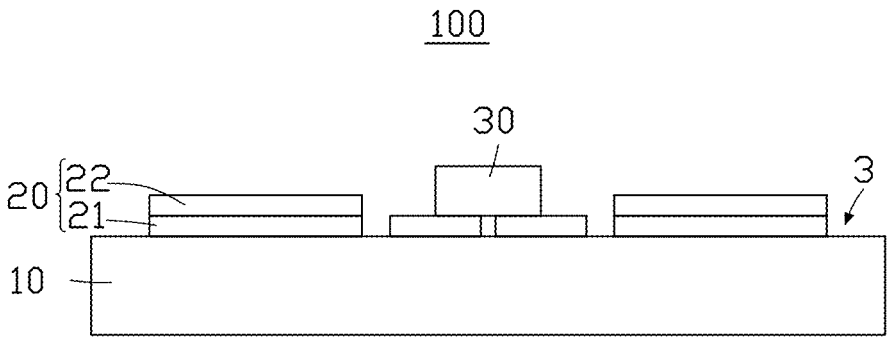
FIG. 1 shows a schematic diagram of a structure of a lens assembly of the present application in an embodiment.
Figure 2:
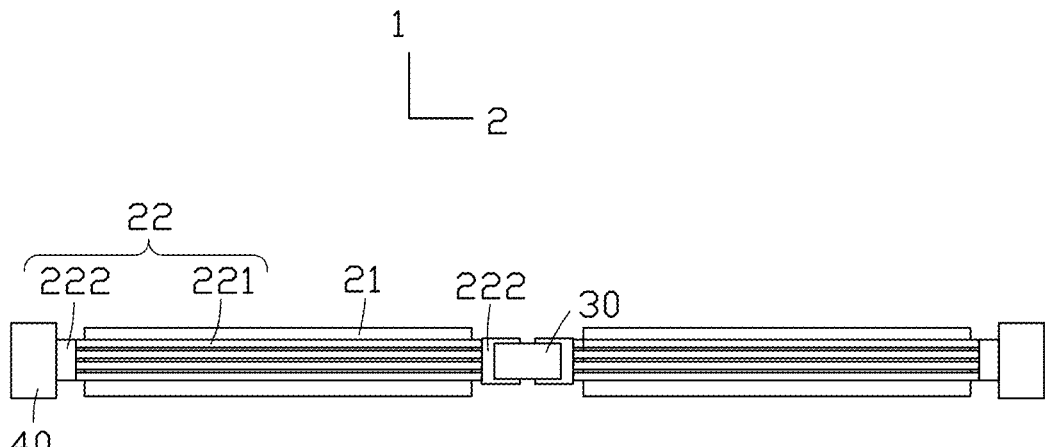
FIG. 2 shows a schematic diagram of a structure of a conducting assembly of a lens assembly of the present application in an embodiment.

Referring to FIG. 1 to FIG. 2, in one embodiment, the lens assembly 100 includes a lens 10, a sensing assembly 30, and one or more conducting assemblies 20.

The sensing assembly 30 is positioned on a first side 3 of the lens 10 near eyeballs. The sensing assembly 30 is configured to track a position of the eyeballs. Each conducting assembly 20 is positioned on the first side 3 of the lens. The first side 3 of the lens is a side of the lens 10 near the eyeballs.

The conducting assembly 20 comprises a transparent conductive layer 21 and a metal mesh layer 22. Wherein, the transparent conductive layer 21 is laid on the first side of the lens 10. The metal mesh layer 22 is laid on one side of the transparent conductive layer 21 away from the lens 10. A current channel is formed between the metal mesh layer 22 and the transparent conductive layer 21. The metal mesh layer 22 comprises a plurality of metal wires 221 arranged at intervals. A gap shall be left between any two adjacent metal wires 221. The gap allows a light to pass through, thereby improving a transparency of the entire metal mesh layers 22. The plurality of metal wires 221 are electrically connected to the sensing assembly 30 to form the current channel with the sensing assembly 30. An eye-tracking information collected by the sensing component 30 is transmitted to other components through the metal wires 221.

Therefore, the transparent conductive layer 21 is laid on the first side 3 of the lens 10 and the metal mesh layer 22 is laid on a side of the transparent conductive layer 21 away from the lens 10. The metal mesh layer 22 is electrically connected to the sensing component 30 for a signal transmission. Compared with existing metal wires, the metal mesh layer 22 can disperse a metal wire into a finer metal wire 221, thereby reducing a wire width of the metal wire 221 and making the entire metal wires 221 better transmittance. In addition, a current diffusion capacity of each metal wire 221 is uniform through the transparent conductive layer 21, so that the dispersed metal wire 221 maintains roughly the same current diffusion capacity as the undispersed metal wire 221.

In one embodiment, referring to FIG. 1 to FIG. 2, the lens 10 is made of a glass or an acrylic. In order to avoid blocking a light passing through the lens 10, the sensing assembly 30 is mounted on an edge of the lens 10 or other areas that do not affect the light passing through the lens 10, or a size of the sensing assembly 30 is as small as possible, or the sensing assembly 30 is as transparent as possible. In one embodiment, a thickness range of the sensing assembly 30 is set to 0.01 mm to 1 mm.

The sensing assembly 30 is configured as one or more, and each sensing assembly 30 adopts a photosensitive sensor element. In one embodiment, the sensing assembly 30 can be a vertical cavity surface emitting laser (VCSEL) or infrared light emitting diode, and the sensing assembly 30 is configured to emit a light at an eye to track a position of the eye.

In one embodiment, referring to FIG. 1 to FIG. 2, the conducting assembly 20 is configured to be arranged with another conducting assembly 20 in a pair of conducting assemblies 20, the pair of conducting assemblies 20 are arranged on opposite sides of the sensing assembly 30, and the pair of conducting assemblies 20 and the sensing assembly 30 are laid on the first side 3. The sensing assembly 30 is attached to a surface of the lens 10 by an adhesive material such as a transparent adhesive. The transparent conductive layers 21 of the pair of conducting assemblies 20 are arranged at intervals to form a gap between the two transparent conductive layers 21, and the sensing assembly 30 is mounted on the lens and located at the gap.

The transparent conductive layer 21 adopts a transparent material with conductive properties. Material of the transparent conductive layer 21 may include one or more of ITO (indium tin oxide), IZO (indium zinc oxide), AZO (aluminum-doped zinc oxide), or GZO (gallium-doped zinc oxide).

When the transparent conductive layer 21 is processed on the lens 10, a corresponding pattern of the transparent conductive layer 21 is formed on a surface of the lens 10 through a yellow light micro-shadow technology, and then the transparent conductive layer 21 is formed after the surface of the lens 10 is coated by sputtering or evaporation.

The plurality of the metal wires 221 of the two conducting assemblies 20 are electrically connected to the sensing assembly 30 to achieve an electrical signal transmission between the pair of conducting assemblies 20 and the sensing assembly 30. One of the pair of conducting assemblies 20 is electrically connected to an input of the sensing assembly 30, and the other conducting assembly 20 of the two conducting assemblies is electrically connected to an output of the sensing assembly 30.

A thickness of the transparent conductive layer 21 should be small. In one embodiment, the thickness of the transparent conductive layer 21 should be less than 1 mm, in order to avoid the thickness of the transparent conductive layer 21 affecting a continuity of the metal wire 221 laid on the transparent conductive layer 21 and the sensing assembly 30 installed directly on a surface of the lens 10. The thickness of the transparent conductive layer 21 is greater than 10 nm to ensure that the transparent conductive layer 21 has sufficient thickness, and the transparent conductive layer 21 has the sufficient thickness to process a corresponding pattern when the metal mesh layer 22 is laid.

In one embodiment, referring to FIG. 1 to FIG. 2, multiple metal wires 221 are spaced in the first direction 1. A distance between any two adjacent metal wires 221 is 5 um~145 μm. In addition, a wire width of the metal wire 221 is 1 nm~50 μm, and the wire width of the metal wire 221 can reach a minimum of 1 nm, which greatly reduces the wire width of the metal wire 221 and improves a transparency of the metal wire 221.

An extension direction of the metal wire 221 is parallel to a second direction 2, the second direction 2 is perpendicular to the first direction 1, and the second direction 2 and the first direction 1 are parallel to a surface of the transparent conductive layer 21 away from the lens 10.

The plurality of the metal wires 221 are laid on a side of the transparent conductive layer 21 away from the lens 10. The plurality of the metal wires 221 are electrically connected with the transparent conductive layer 21. The transparent conductive layer 21 equalizes a current diffusion capacity of each metal wire 221.

In one embodiment, the metal mesh layer 22 can be machined on a surface of the lens 10 by means of the transparent conductive layer 21. In one embodiment, a pattern corresponding to the metal mesh layer 22 is formed on a surface of the lens 10 by a yellow light micro-shadow technology, and then the metal mesh layer 22 is formed after a surface of the lens 10 is coated by sputtering or evaporation.

In one embodiment, referring to FIG. 1 to FIG. 2, the metal mesh layer 22 further includes two terminals 222, the two terminals 222 are arranged on opposite sides of the transparent conductive layer 21 respectively. Two ends of the plurality of the metal wire 221 exceed the transparent conductive layer 21, and the two ends of the plurality of the metal wire 221 are electrically fixed to the two terminals 222, and the two ends of the plurality of the metal wire 221 are electrically connected to the two terminals 222.

An input end of the sensing assembly 30 is connected to the terminal 222 of a metal mesh layer 22, and an output end of the sensing assembly 30 is connected to the terminal 222 of another metal mesh layer 22.

In one embodiment, referring to FIG. 1 to FIG. 2, the lens assembly 100 further includes a control assembly 40, the control assembly 40 is arranged in two, and the two control assemblies 40 are arranged separately on one side of the pair of conducting assemblies 20 away from the sensing assembly 30. The control assembly 40 is electrically connected with a plurality of the metal wires 221 to realize a signal transmission between the control assembly 40 and the sensing assembly 30.

A first end of the plurality of the metal wire 221 extends beyond the transparent conductive layer 21, and the first end of the plurality of the metal wire 221 is electrically connected to the sensing assembly 30. A second end of the plurality of the metal wire 221 extends beyond the transparent conductive layer 21, and the second end of the plurality of the metal wire 221 is electrically connected to the control component 40, thus forming a current channel between the sensing assembly 30 and the control assembly 40. The sensing assembly 30 and the control assembly 40 transmit signals through the current channel.

Specifically, two terminals 222 of a metal mesh layer 22 are respectively connected to the sensing assembly 30 and a control assembly 40, and two terminals 222 of another metal mesh layer 22 are respectively connected to the sensing assembly 30 and another control assembly 40, so that the two control assemblies 40 are electrically connected to the sensing assembly 30.

In one embodiment, the control assembly 40 may be fixed directly to the terminal 222. In other embodiments, the control assembly 40 may also be fixed at an edge of the lens 10 and electrically connected to the terminal 222 by other metal mesh layers 22.

In some embodiments, the control assembly 40 can control the sensing assembly 30 to emit or stop emitting a light.

In other embodiments, the control assembly 40 may be provided with an optical signal receiving element. A light emitted by the sensing assembly 30 is reflected by an eyeball and forms a feedback light. The optical signal receiving element receives the feedback light and then transmits the feedback light to the control assembly 40. The control assembly 40 then determines a position of the eyeball according to a time of the feedback light or a direction of the feedback light.

Figure 3:
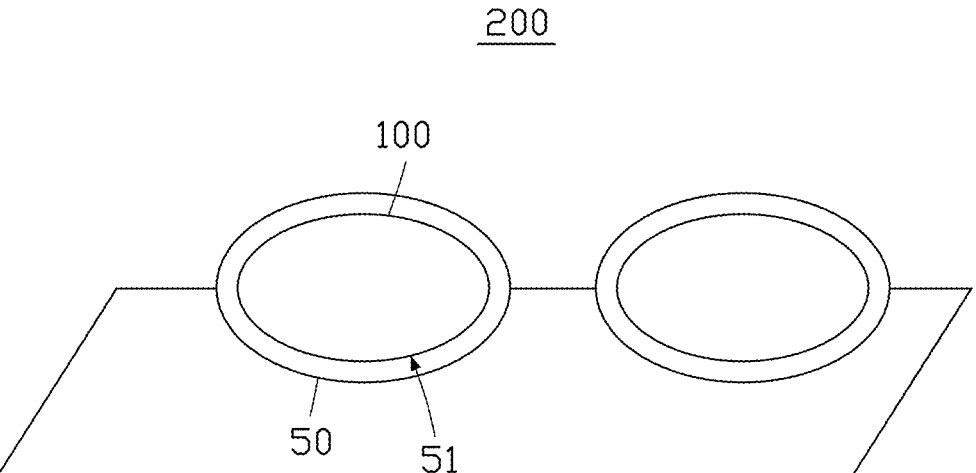
FIG. 3 shows a schematic diagram of a structure of AR glasses in an embodiment.

As shown in FIG. 3, a present application embodiment further provides AR glasses 200. The AR glasses 200 comprises a frame 50 and two lens assemblies 100. The two lens assemblies 100 mounted on the frame 50. The frame 50 is provided with two mounting ports 51, each of the two mounting ports 51 is fitted with a lens assembly 100, each of the two lens assemblies 100 tracks a position information of an eyeball corresponding to it.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A lens assembly, comprising:

a lens;

a sensing assembly, provided on a first side of the lens;

one or more conducting assemblies, provided on the first side of the lens, each conducting assembly comprises a transparent conductive layer, and a metal mesh layer; the conducting assembly is configured to be arranged with another conducting assembly in a pair of conducting assemblies, the pair of conducting assemblies are arranged on opposite sides of the sensing assembly, and the plurality of metal wires of the pair of conducting assemblies are electrically connected to the sensing assembly;

wherein, the transparent conductive layer is placed on the first side of the lens, the metal mesh layer is placed on a side of the transparent conductive layer away from the lens, the metal mesh layer comprises a plurality of metal wires arranged at intervals, the plurality of the metal wires are electrically connected to the sensing assembly;

the lens assembly further comprises two control assemblies, each of the two control assemblies is arranged on a respective side of the pair of conducting assemblies away from the sensing assembly, and the pair of control assemblies are electrically connected with the plurality of the metal wires to transmit signals with the sensing assembly; a first end of the plurality of the metal wire extends beyond the transparent conductive layer, and the first end of the plurality of the metal wire is electrically connected to the sensing assembly, a second end of the plurality of the metal wire extends beyond the transparent conductive layer, and the second end of the plurality of the metal wire is electrically connected to the control assemblies.

2. The lens assembly as claimed in claim 1, wherein, the plurality of the metal wires are arranged at intervals along a first direction, an extension direction of the metal wire is parallel to a second direction, the second direction is perpendicular to the first direction, each of the second direction and the first direction is parallel to a surface of the transparent conductive layer away from a side of the lens.

3. The lens assembly as claimed in claim 2, wherein, the plurality of the metal wires are fixed on a side of the transparent conductive layer away from the lens, and the plurality of the metal wires are electrically connected with the transparent conductive layer.

4. The lens assembly as claimed in claim 2, wherein, a wire width of each of the plurality of the metal wires is 1 nm~50 um.

5. The lens assembly as claimed in claim 1, wherein, a thickness of the transparent conductive layer is greater than 10 nm.

6

6. Augmented reality (AR) glasses, comprising:

a frame, two lens assemblies, each of the two lens assemblies comprising:

a lens;

a sensing assembly, provided on a first side of the lens;

one or more conducting assemblies, provided on the first side of the lens, each conducting assembly comprises a transparent conductive layer, and a metal mesh layer; wherein, the transparent conductive layer is placed on the first side of the lens, the metal mesh layer is placed on a side of the transparent conductive layer away from the lens, the metal mesh layer comprises a plurality of metal wires arranged at intervals, the plurality of the metal wires are electrically connected to the sensing assembly; the conducting assembly is configured to be arranged with another conducting assembly in a pair of conducting assemblies, the pair of conducting assemblies are arranged on opposite sides of the sensing assembly, and the plurality of metal wires of the pair of conducting assemblies are electrically connected to the sensing assembly; the lens assembly further comprises two control assemblies, each of the two control assemblies is arranged on a respective side of the pair of conducting assemblies away from the sensing assembly, and the pair of control assemblies are electrically connected with the plurality of the metal wires to transmit signals with the sensing assembly; a first end of the plurality of the metal wire extends beyond the transparent conductive layer, and the first end of the plurality of the metal wire is electrically connected to the sensing assembly, a second end of the plurality of the metal wire extends beyond the transparent conductive layer, and the second end of the plurality of the metal wire is electrically connected to the control assemblies;

wherein, the two lens assemblies are mounted in the frame.

7. The AR glasses as claimed in claim 6, wherein, the frame is provided with two mounting ports, and the two lens assemblies are respectively mounted in the two mounting ports.

8. The AR glasses as claimed in claim 6, wherein, the plurality of the metal wires are arranged at intervals along a first direction, an extension direction of the metal wire is parallel to a second direction, the second direction is perpendicular to the first direction, each of the second direction and the first direction is parallel to a surface of the transparent conductive layer away from a side of the lens.

9. The AR glasses as claimed in claim 8, wherein, the plurality of the metal wires are fixed on a side of the transparent conductive layer away from the lens, and the plurality of the metal wires are electrically connected with the transparent conductive layer.

10. The AR glasses as claimed in claim 8, wherein, a wire width of each of the plurality of the metal wires is 1 nm~50 um.

11. The AR glasses as claimed in claim 6, wherein, a thickness of the transparent conductive layer is greater than 10 nm.

* * * * *